Jan. 9, 1940.    R. SELIGMAN ET AL    2,186,501
FILTER PRESS
Filed April 20, 1938    3 Sheets-Sheet 1
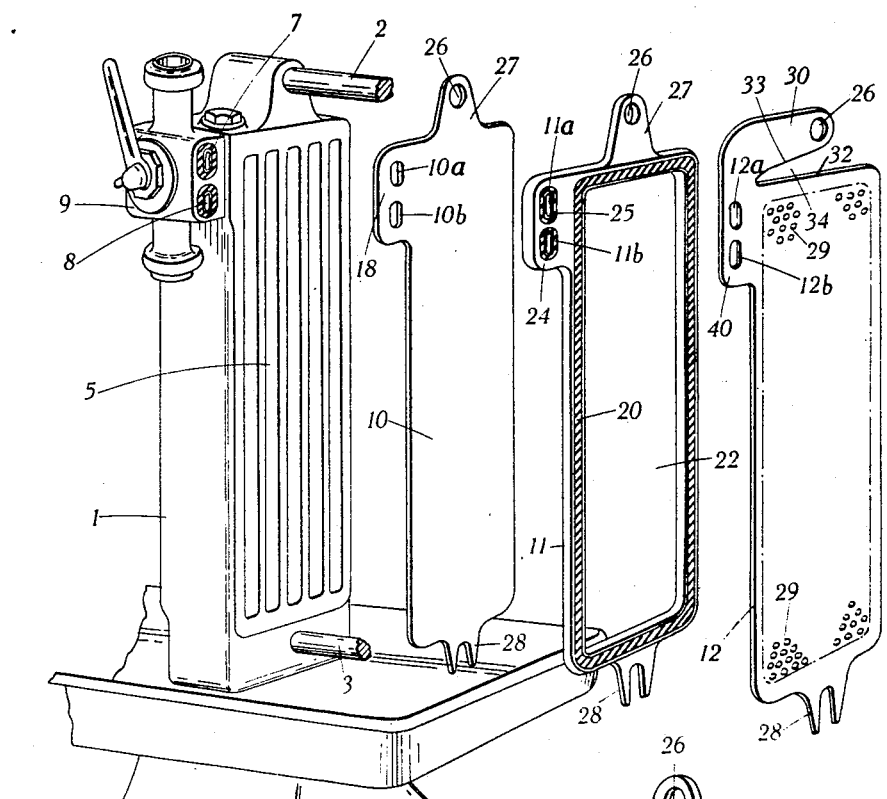
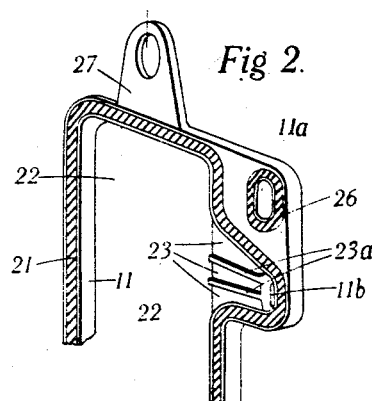
INVENTORS
R. SELIGMAN
H. F. GOODMAN
BY
Young, Emery & Thompson
ATTORNEYS

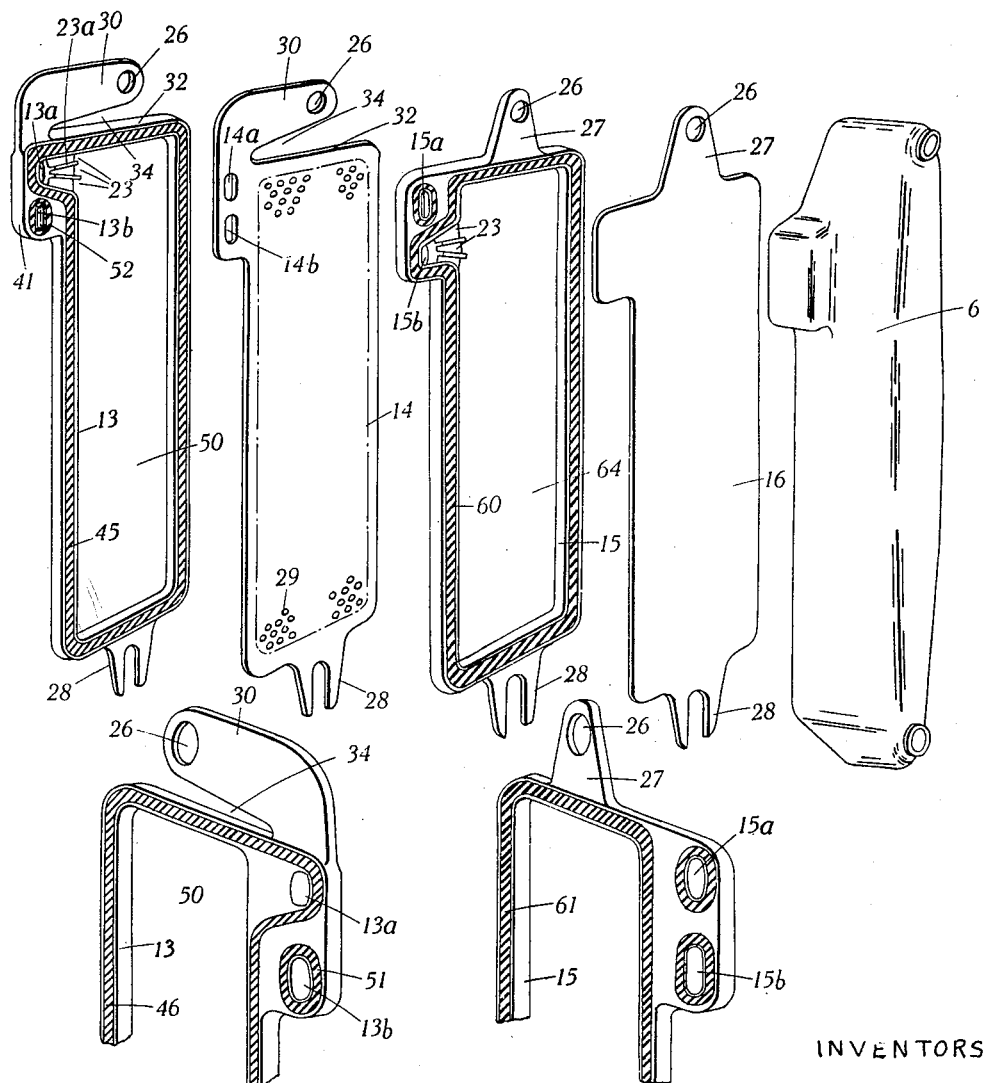

Jan. 9, 1940.  R. SELIGMAN ET AL  2,186,501
FILTER PRESS
Filed April 20, 1938   3 Sheets-Sheet 3
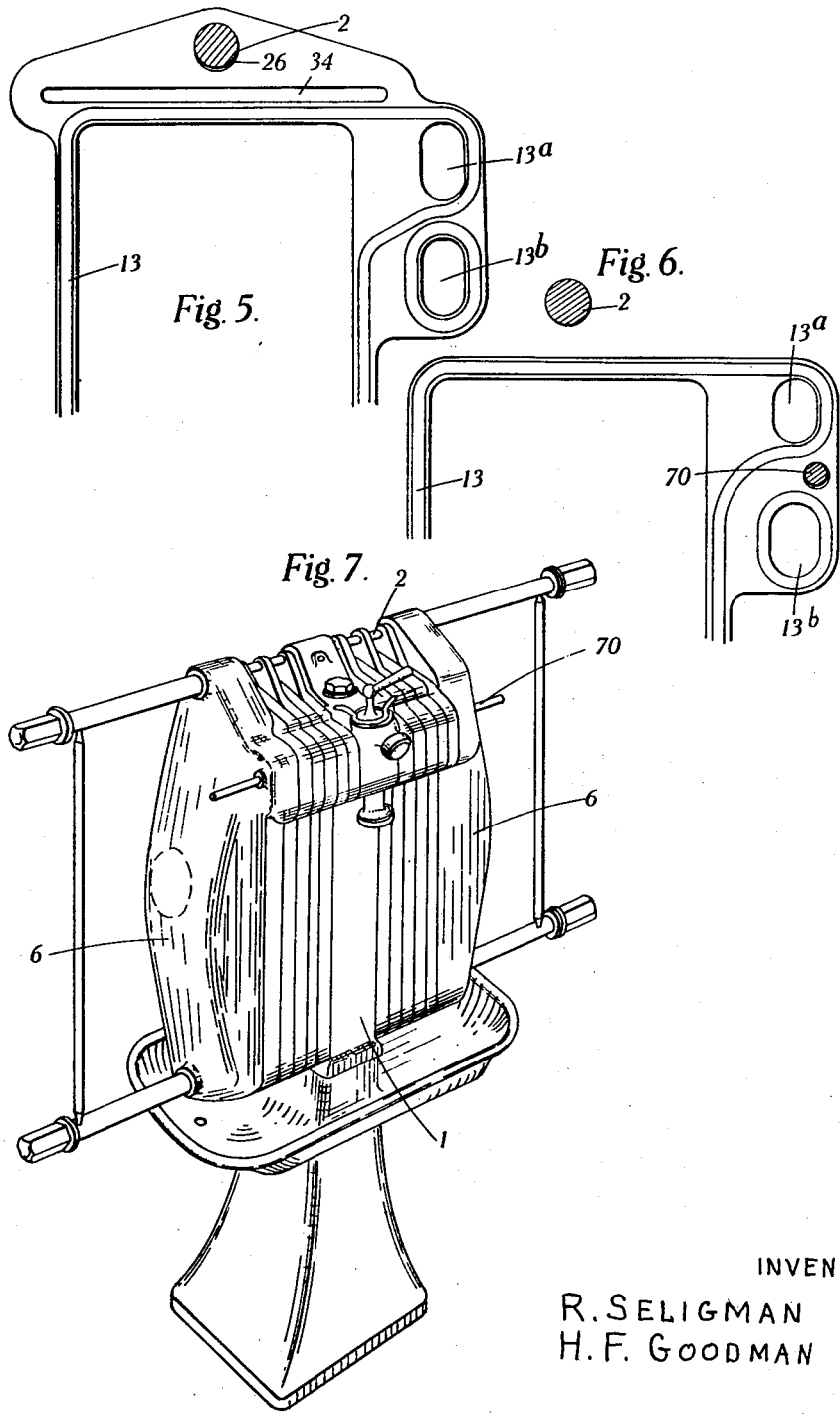
INVENTORS
R. SELIGMAN
H. F. GOODMAN Patented Jan. 9, 1940

2,186,501

UNITED STATES PATENT OFFICE 2,186,501

FILTER PRESS

Richard Seligman and Hugh Frederick Goodman, Point Pleasant, Wandsworth, London, England, assignors to The Aluminum Plant & Vessel Company Limited, Point Pleasant, Wandsworth, London, England Application April 20, 1938, Serial No. 203,184
In Great Britain September 24, 1937

8 Claims. (Cl. 210—188)

This invention relates to filter presses such as are used for the filtering of milk and other potable liquids and has particular reference to filter presses which are made up of a series of juxtaposed elements, e. g. plate members and frame members disposed alternately, provided with suitable channels for guiding the liquid to the filtering surfaces or cloths.

According to the invention, there is provided an improved form of filter press in which the elements are mounted so as to be capable of being slid along horizontally disposed guide bars arranged at or near the upper and lower ends of the elements in such positions as to provide for the unobstructed introduction and removal of the filtering member or cloth.

In order that the said invention may be clearly understood and readily carried into effect, the same will now be more fully described with reference to the accompanying drawings in which:

Fig. 1 is a view showing in perspective the principal parts of one form of filter press produced in accordance with the invention, the various elements being, for simplicity of description, shown separated;

Figs. 2, 3 and 4 are fragmentary views showing the forms of the reverse sides of the upper ends of three of the frame members illustrated in Fig. 1;

Figs. 5 and 6 are fragmentary views illustrating two alternative forms of frame members which may be used in carrying out the invention; and Fig. 7 is a perspective view of a modified form of filter press produced in accordance with the invention.

In the form of the invention illustrated in Figs. 1 to 4, the press consists of a vertical support or pedestal 1 provided at one or both sides thereof with a pair of laterally projecting side arms or guide bars 2 and 3 forming respectively top and bottom supporting members for the juxtaposed elements of the press, which elements are slidably mounted on the said guide bars and are adapted to be clamped in position between the face 5 of the pedestal and an end plate 6 also slidably mounted on the guide bars.

As shown in Fig. 1, there are seven of the aforesaid elements arranged in position between the pedestal and the end plate but it will be appreciated that the number of elements used in any particular case and their form will depend upon the requirements to be met.

The aforesaid elements consist of plate members 10, 12, 14 and 16 composed of metal (e. g. stainless steel) and frame members 11, 13 and 15 also composed of metal (e. g. stainless steel), the frame members being arranged so that they alternate with the plate members. At their lower ends each of the said elements is formed with a downwardly extending and slotted lug 28 for enabling the same to be slidably mounted in position on the lower guide bar 3. Also, at or near their upper ends, the elements are formed with lugs having openings 26 for enabling the same to be supported from the upper guide bar 2, these lugs being of two different forms as hereinafter described.

The first element or plate member 10 is provided at or near its upper end with a laterally offset portion 18 having formed therein a pair of through ports 10a and 10b for registration with a pair of ports 7 and 8 formed in a distributing cock 9 which is mounted in position near the upper end of the pedestal. Next to the plate member 10 is disposed the frame member 11 which is also formed with a laterally offset portion provided with a pair of ports 11a and 11b for registration with the ports 10a and 10b. At its marginal edges the frame member 11 is formed with a pair of continuous packing receiving grooves disposed one at each face thereof (back and front) and accommodating rubber or like packings or gaskets 20 and 21. As may be seen from a comparison of Figs. 1 and 2, the gasket 20 is of rectangular formation and is adapted to separate the space 22 within the frame from the ports 11a and 11b whereas, at the other side of the frame, the gasket 21 passes around the outer edge of the port 11b and facial grooves 23 with intervening ribs 23a are formed in the thickness of the frame in order to provide communicating channels between the space 22 within the frame and the port 11b. At the opposite side of the frame, the port 11b is surrounded by a gasket 24 and similar gaskets 25 and 25' are provided around the port 11a so that they are disposed one at each face of the frame. It will be observed that both the plate member 10 and the frame member 11 are provided at the upper edges with upwardly extending lugs 27 in which the aforesaid openings 26 are formed.

Next to the frame member 11 is arranged a plate member 12 which is similar in many respects to the plate member 10 in that it is provided with a laterally offset portion 40 having two ports 12a and 12b for registration with the ports 11a and 11b. Whereas, however, the plate 10 is mainly imperforate, the plate 12 is provided over the greater part of its surface and inwardly of its marginal edges with a series of perforations 29. Also, at its upper end, the plate member 12 is provided with a lug 30 which, in contradistinction to the lugs 27 of the members 10 and 11, is in the form of an offset from the said laterally offset portion 40 and extends over the upper edge 32 of the plate so that between the edge 32 and the underside 33 of the lug 30 there is formed a horizontally disposed slot 34.

Next to the plate member 12 is arranged a frame member 13 which is similar to the frame 11 in that it is provided at or near its upper end with a laterally offset portion 41 formed with two ports 13a and 13b for registration with the ports 12a and 12b. At its upper end, however, the frame 13 is provided with a lug 30 and slot 34 corresponding with those provided at the upper end of the plate 12. The frame 13 is also provided at its marginal edges with a pair of continuous packing receiving grooves disposed one at each face thereof (back and front) and accommodating rubber or like packings or gaskets 45 and 46. The gasket 45 at one face of the frame passes around the outer edge of the port 13a and facial grooves 23 with intervening ribs 23a are formed in the thickness of the frame in order to provide communicating channels between the space 50 within the frame and the port 13a. Also, as will be seen from Fig. 3, the gasket 46 also passes around the outer edge of the port 13a, so that the port 13b which is surrounded by gaskets 51 and 52, is isolated from the space 50.

Next to the frame 13 is arranged a perforated plate member 14 which is provided with ports 14a and 14b and is similar in all respects to the plate member 12 and next to the plate 14 is arranged the frame member 15 which is formed with ports 15a and 15b and is similar to the frame 11 except as regards the configuration or disposition of its gaskets 60 and 61. As will be seen from a comparison of Figs. 1 and 4, the gasket 60 passes around the outer edge of and includes the port 15b within the space 64 within the frame but excludes the port 15a therefrom whereas the gasket 61 is of rectangular formation and shuts off communication between the space 64 and the ports 15a and 15b.

The last of the said series of elements, namely, the plate 16, is similar to the plate 10 but is devoid of ports.

The particular arrangement of the elements described above and the arrangement of their ports and packings is suitable for use with a press in which the milk or other liquid to be filtered is to be fed into the spaces 22 and 64 within the elements 11 and 15 and is required to pass from these spaces through suitable filtering members or cloths into a common receiving chamber formed by the space 50 within the central element 13 and from the receiving chamber to the filter outlet. In such a case, a double filter cloth may be used and may be arranged in position in the press so that the fold rests upon the upper edges 32 of the juxtaposed elements 12, 13 and 14 and so that it extends downwardly with one portion thereof disposed between the elements 11 and 12 and with the other portion thereof disposed between the elements 14 and 15, the arrangement being such that the marginal edges of the doubled cloth are held in position by the gaskets 20 and 61. With such an arrangement, it will be seen that milk to be filtered entering through the inlet port 8 can pass through the port 10b to the port 11b. At this point, the milk will be divided into two streams one passing through the passages 23 into the space 22 and the other passing on through the ports 12b, 13b, 14b and 15b and through the passages 23 formed in the frame 15 to the space 64. From each of the spaces 22 and 64, the milk can pass through the two downwardly extending portions of the filtering cloth and the perforations 29 formed in the plates 12 and 14 into the space 50 within the central frame 13. From the latter the filtered milk can pass upwardly and out through the ports 13a, 12a, 11a and 10a to the filtered milk outlet 7.

In cases in which the milk to be filtered is required to be led into the central space 50 and to be filtered as it passes outwardly therefrom into the spaces 22 and 64, the filter cloth may be arranged so that the fold rests upon the upper edge 32 of the frame 13 and so that it extends downwardly with one portion disposed between the elements 12 and 13 and the other portion thereof disposed between the elements 13 and 14 and, in such a case, the port 7 is connected with the milk inlet and the port 8 is connected with the milk outlet. Also, for such an arrangement, the lugs 30 on elements 12 and 14 may, if desired, be replaced by lugs of the form of the lugs 27 and the passages 23 in the frame 13 are preferably formed entirely within the thickness of the frame (i. e. without being open at one side) whilst the gaskets 45 and 46 are preferably of rectangular form and do not encircle any of the ports. Alternatively, the frame 13 may be replaced by two such frames, one right-handed and the other left-handed, placed face to face to form a port closed at both sides.

It will be observed that, in the arrangements described above, notwithstanding the fact that each of the elements is supported both at its upper and at its lower ends, the upper edge or edges of the element or elements by which the filter cloth is carried is or are, owing to the provision of the horizontal slot or slots 34, left free and open for the unobstructed introduction of the filtering cloth thereby enabling the filter cloth to be slid into position from one side of the press and facilitating the fitting or removal of the same.

In some instances, the slot or slots 34 may be closed at both ends thereof and the filter cloth may be passed endwise therethrough instead of being slid in position by passing it along the length of the slot and one form which the upper end of the filter cloth carrying element or elements may then assume is illustrated in Fig. 5.

According to another mode of carrying the invention into effect, the plate members may be slidably supported in position on the guide bars 2 and 3 and the frame members or certain of them (e. g. the frame or frames by which the filter cloth is carried) may be formed so that its or their overall height is less than that of the plate members and so that the said frame or frames is or are slidably mounted on the lower guide bar with its or their upper portions disposed wholly beneath the upper guide bar. Such an arrangement is illustrated in Fig. 7 and, in this arrangement, the frame member or members may have their upper ends formed as shown in Fig. 6 and may be slidably mounted near their upper ends on a third and laterally displaced guide 70 so as to prevent the frame or frames from moving sideways out of the press. As will be seen, this arrangement also enables the upper edge or edges of the element or elements by which the filter cloth is carried to be left free and open for the unobstructed introduction and removal of the filtering cloth.

It will also be appreciated that by making the press double sided as is shown, for example, in Fig. 7, one side may be used for filtering whilst the other is opened for the removal and replacement of the filter cloth.

Having now particularly described and ascertained the nature of the invention and in what manner the same is to be performed we declare that what we claim is:

1. A filter press of the character described, comprising upper and lower guide bars, filter elements, upper and lower means for mounting said elements on said bars for sliding horizontal movement thereon, said lower mounting means extending downwardly from the lower portion of the elements and upper mounting means extending laterally from one side of the elements adjacent the upper edge thereof leaving one side edge and the upper edge of said elements, on which a filter cloth is supported, free to facilitate the application and removal of filter cloths when the press is open.

2. A filter press of the character described, comprising upper and lower guide bars, filter elements, and upper and lower means for mounting said elements on and between said bars for sliding horizontal movement thereon, said lower mounting means extending downwardly from the lower portion of the elements and said upper mounting means extending laterally from one side of the elements adjacent the upper edge thereof and then upwardly above the upper edge of the elements and laterally toward the other side edge of the element with the lateral portion thereof spaced from the upper edge of the element leaving said upper edge and one side edge of the elements free to facilitate application and removal of filter cloths when the press is open.

3. A filter press of the character described, comprising upper and lower guide bars, a plurality of alternate plates and frames, certain of said plates and frames being adapted to support a filter cloth extending over their upper edges, means extending downwardly from the lower edges of said plates and frames for mounting the plates and frames on said lower bar, means extending from the upper edges of those plates and frames which do not carry filter cloths for mounting the same on the upper bar, a third horizontal bar extending along one side of the plates and frames adjacent the upper edge thereof, and means extending from side edges of the plates and frames adjacent the third bar for mounting the plates and frames thereon while leaving the upper edge and the other side edge of said certain plates and frames free to facilitate the appplication and removal of filter cloths when the press is open.

4. A filter press of the character described having plate and frame elements, and upper and lower horizontal bars for supporting the plate and frame elements, one of said elements being adapted to have a filter cloth supported on the upper edge thereof, said filter cloth carrying element having a lug extending from the lower edge thereof for mounting the cloth carrying element on the lower bar, and means extending from one side thereof for mounting the same on the upper bar while leaving the other side and the upper edge of the body of the cloth carrying element free to facilitate the application and removal of a filter cloth when the press is open.

5. A filter press of the character described having plate and frame elements, and upper and lower horizontal bars for supporting the plate and frame elements, one of said elements being adapted to have a filter cloth supported on the upper edge thereof, said filter cloth carrying element having a lug extending from the lower edge thereof for mounting the cloth carrying element on the lower bar, and means extending from one side thereof and up over and spaced from the upper edge of the element toward the other side edge thereof for mounting the element on the upper bar while leaving said other side edge and the upper edge of the body of the element free to facilitate the application and removal of a filter cloth when the press is open.

6. A filter press of the character described having plate and frame elements, and upper and lower horizontal bars for supporting the plate and frame elements, one of said elements being adapted to have a filter cloth supported on the upper edge thereof, said filter cloth carrying element having a lug extending from the lower edge thereof for mounting the cloth carrying element on the lower bar, a third bar extending horizontally along one side of the elements adjacent the upper portion thereof, and means extending from one side of the cloth carrying element for mounting the same on said third bar while leaving the other side and the upper edge of the body of the cloth carrying element free to facilitate the application and removal of a filter cloth when the press is open.

7. A filter press according to claim 4, in which said cloth carrying element is a frame and two perforated plates are disposed on each side of the frame, and means for passing liquid to be filtered through the plates into the cloth carrying plate which serves as a common receiving chamber.

8. A filter press according to claim 4, in which said cloth carrying element is a frame and two perforated plates are disposed on each side of the frame, and means for passing liquid to be filtered into the cloth carrying frame and thence in opposite directions through the perforated plates.

RICHARD SELIGMAN.
HUGH FREDERICK GOODMAN.